Nov. 28, 1950  J. R. TONEY  2,531,955
EGG HOLDER
Filed Sept. 23, 1947

INVENTOR.
JOHN R. TONEY
BY Harold W. Mattingly
Attorney

Patented Nov. 28, 1950

2,531,955

UNITED STATES PATENT OFFICE 2,531,955

EGG HOLDER

John R. Toney, Los Angeles, Calif.

Application September 23, 1947, Serial No. 775,586

3 Claims. (Cl. 65—22)

My invention relates to egg holders, and has particular reference to an egg holder that is self-grasping or self-actuated, and that is merely placed in juxtaposition to the egg and thereafter itself operates to engage the egg.

Egg holders are widely used to grasp cooked eggs while still too hot to be comfortably grasped by the fingers. An egg holder may be employed for each end of the egg so that it may be handled with security. While thus held, the egg shell may be broken so that the contents may be removed, or the holders may be used for merely transporting a hot egg from one place to another.

While egg holders of various constructions have been devised from time to time, these have generally been of the type that were pre-formed to match the surface of the egg closely. Accordingly the engagement with the shell has been of the cupping type, and therefore has not been too secure. For this reason it has been necessary to employ a pair of egg holders to grasp an egg with certainty.

My invention provides an egg holder of resilient construction wherein the engagement of the egg is by friction against a rubber or rubberlike surface. Further, the egg holder is so constructed that contact is obtained by a rolling of the resilient material of the holder upon the egg shell. Additionally, holders of my invention may be constructed in the form of a mounting base or pedestal to support an egg upon a table when the contents thereof are eaten directly from a shell having the upper portion removed.

It is therefore a general object of my invention to provide an improved egg holder.

Another object of my invention is to provide a resilient egg holder having a rolling action for engaging an egg.

A further object of my invention is to provide an egg holder for one end of an egg wherein the holder is adapted to support the egg vertically so that the contents may be consumed directly.

Still another object of my invention is to provide a resilient egg holder having a rolling contact action which is also the type adapted to support an egg upon a table top.

Other objects and advantages of my invention will be apparent in the following description and claims, considered together with the accompanying drawings, in which:

Figure 1:
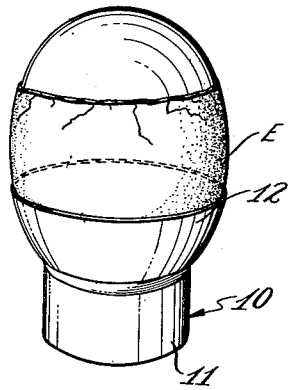
Fig. 1 is a perspective view of a presently preferred embodiment of my invention supporting an egg in a vertical position so that the contents of the shell may be directly consumed.
Figure 2:
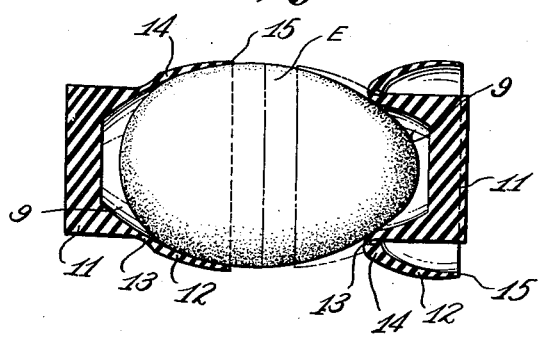
Fig. 2 is a sectional view of a pair of egg holders made in accordance with my invention showing one egg holder as already grasping the egg, and the other egg holder as placed in position preparatory to grasping the egg.

Referring to Figs. 1 and 2, an egg holder 10 may have a base portion 11 having an integral cup portion 12. The entire egg holder 10 may be formed of a resilient material such as natural rubber, synthetic rubber, or resilient organic plastic, and is preferably formed as a single piece molding in a single step molding process.

While the egg holder 10 could be employed by a mere cupping action upon an egg E, there is illustrated in Fig. 2 a rolling action provided particularly in accordance with my invention. This rolling action, as illustrated in the right-hand cup of Fig. 2, is made possible by the dimensioning of the cup walls, as is most clearly illustrated in the left-hand cup of Fig. 2.

Referring now to the left-hand cup of Fig. 2, it will be noted that the major part of the base 11 may have thick walls, but that the outwardly flared portions that form the cup 12 may be thinned as at 13 to provide a weakened circumferential or annular region. The outermost portions of the cup 12 immediately adjacent this thin section 13 are thickened as at 14, and may taper to a thinner section toward the outer tip or rim of the cup shape 12 as at 15.

The effect of the selected wall thicknesses is clearly illustrated in the right-hand cup of Fig. 2, and there it will be noted that the outer portion of the cup 12 may be folded back against the base 11, the fold taking place at the thinned section 13. The result is that the folded back portion of the cup 12 is in a condition of unstable equilibrium, inasmuch as the thickened wall portions 14 are under considerable tension and tend to unroll the folded back cup by seeking the smaller circumferential portion of the egg immediately adjacent thereto. This tendency towards instability is not materially counteracted by the tension of the outer tip 15 of the cup shape, inasmuch as this section is quite thin and therefore offers relatively little resistance compared to the thick section 14.

In operating the egg holder of my invention, the cup is folded back upon the base 11 as illustrated by the right-hand holder of Fig. 2. This folded back holder may then be placed adjacent one end of the egg, and the operator may then give the outer tip 15 a flick with his fingers, causing the entire folded back cup 12 to roll onto the egg E. This rolling is due to the unstable equilibrium of the holder in its folded back condition due to the thickened portion 14, and the rolling action will not only expel water and air ahead of it as the cup 12 advances on the egg, but will also give rise to a stretching of the cup 12 so that the egg E will be gripped resiliently. This resilient gripping effected by the rolling action is equivalent to a cupping action obtained by a force that would ordinarily crush the egg.

Once the holder has been rolled upon the egg as illustrated in Fig. 1 and as illustrated by the left-hand holder of Fig. 2, the egg may be securely picked up by one holder alone, inasmuch as the resilient grip on the egg is ordinarily airtight, particularly if the egg surface or cup is slightly dampened. Accordingly, therefore, any tendency of the egg to slide out of the resilient grip of the holder will be counteracted by atmospheric pressure, pressing the egg back against the partial vacuum cavity of the interior of the base 11. This vacuum action is an inherent characteristic of my egg holders, and occurs due to the inward compression of the side walls of the recess 9 of the base 11 due to the tensioning of the thick portion 14 as the cup 12 is folded back over the base 11. When the cup unrolls, as illustrated by the left-hand cup of Fig. 2, the compression of the side walls, particularly adjacent the thin region 13, is removed, and these expand to their preformed size, thus creating a slight partial vacuum.

Figure 3:
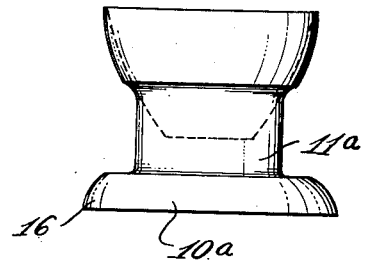
Fig. 3 is an elevation view of a modified form of the invention illustrating an enlarged base for more securely mounting an egg upon a table top.

Illustrated in Fig. 3 is a modified form of egg holder 10a wherein the base 11a is provided with an outwardly flared flange 16, giving a large contact area with a table top or other surface upon which the holder is placed. This wide base 16 permits the eating of the contents of the egg without grasping the holder or the egg itself. It will be appreciated, however, that the egg holder 10 has a flat base that also permits the vertical support of an egg upon a table surface.

Figure 4:
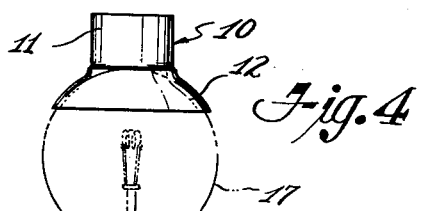
Fig. 4 is an illustration of the use of the egg holder of Fig. 1 as applied to picking up any hot, rounded object, and for illustrative purposes an incandescent lamp is shown.

Illustrated in Fig. 4 is the application of the holder 10 to other hot objects, and there is illustrated, for exemplary purposes only, an incandescent lamp 17. Assuming that an incandescent lamp has been operating for some period of time so as to be too hot to grasp directly with the fingers, a folded back egg holder as illustrated in the right-hand part of Fig. 2 may be disposed over any curved portion of the lamp and the edge 15 may be flicked to cause the folded back cup to roll over the surface. The frictional contact of the cup with the lamp 17 will be sufficient not only for unscrewing the lamp from its socket, but also for carrying it or otherwise handling it.

From the foregoing description of my invention it will be obvious that I have provided an egg holder that differs radically from the ordinary cupping type of egg holder in that a resilient grip upon an egg is obtained by a rolling action of resilient portions of the egg holder. Furthermore, this resilient frictional engagement is aided by an inherent vacuum pressure that materially assists in gripping the egg so that an egg may be securely and readily handled by means of a single egg holder. Additionally, the egg holder may be so designed as to provide a reliable mount or support for an egg when the contents thereof are eaten directly.

While I have described my invention with respect to specific embodiments thereof, I do not limit myself to the specific structures illustrated, inasmuch as various modifications could be made therein without departing from the true spirit and scope of my invention. Accordingly, therefore, the egg holder disclosed is merely illustrative and not definitive of my invention.

I claim:

1. An egg holder of elastic rubberlike material, comprising a cup-shaped element including a base having a flat bottom adapted to rest on a flat surface and a vertically extending portion to be grasped by the fingers of the user, an outwardly flaring wall portion above said vertically extending portion, said wall portion having a thinned circumferential section adjacent the base, the thinned circumferential wall section being diametrically expansible when pressed against one end of the egg, and a thickened circumferential wall section disposed outwardly of the thinned section, the outer portion of said thickened section being tapered to a thin outer cup rim, said tapered section being sufficiently elastic to permit the thickened wall section to be bent backwardly upon the base at the thinned section, and, when placed against said end of the egg, the turned-back portion may be released to roll forwardly so as elastically to embrace said end of the egg.

2. A holder for eggs, or like-shaped round articles, comprising a base having a flat bottom and a vertically extending portion, a resilient cup-shaped member having the interior thereof approximately shaped to receive one end of the article, and a thinned circumferential section in the cup member providing a weakened annulus immediately adjacent the upper extremity of said vertically extending portion about which the outer portion of the cup may be folded back upon the base portion, the thinned circumferential section being diametrically expansible when pressed against the rounded surface of the article, whereby the holder may be placed against one end of the article when the cup edges are folded backwardly and the folded-back portion manipulated to cause it to roll against the article to substantially its original cup shape.

3. An egg holder formed from elastic rubber-like material comprising a cup shaped element including a base portion and having a flat bottom and a vertically extending portion, an outwardly flaring wall portion of greater diameter than said vertically extending portion, and a diametrically expansible and substantially thinned circumferential portion at the juncture of said outwardly flaring wall portion and said vertically extending portion of said base portion, said outwardly flaring wall portion tapering to a relatively thin outer cup rim and including a thickened circumferential portion immediately adjacent said diametrically expansible thinned portion.

JOHN R. TONEY.

REFERENCES CITED

The following references are of record in the file of this patent:

UNITED STATES PATENTS

| Number | Name | Date |
| --- | --- | --- |
| 28,238 | Ladd | May 8, 1860 |
| 53,712 | Wegrather | Apr. 3, 1866 |
| 508,021 | Jewett | Nov. 7, 1893 |
| 902,428 | Milhado | Oct. 27, 1908 |
| 1,024,286 | Santilli | Apr. 23, 1912 |
| 1,178,147 | Gardner | Apr. 4, 1916 |
| 1,347,548 | Menchen | July 27, 1920 |
| 1,449,358 | Weber | Mar. 20, 1923 |
| 1,753,611 | Lower | Apr. 8, 1930 |
| 1,830,520 | Moyses | Nov. 3, 1931 |
| 2,042,548 | Peters | June 2, 1936 |
| 2,126,689 | Pouliot | Aug. 9, 1938 |
| 2,243,106 | Limbert | May 27, 1941 |
| 2,258,547 | Dodds | Oct. 7, 1941 |
| 2,313,823 | Harrigan | Mar. 16, 1943 |